(12) United States Patent
Walls et al.

(10) Patent No.: US 8,582,196 B2
(45) Date of Patent: Nov. 12, 2013

(54) ELECTROPHORETIC PARTICLES AND PROCESSES FOR THE PRODUCTION THEREOF

(75) Inventors: Michael D. Walls, Dorchester, MA (US); Jason D. Feick, Auburndale, MA (US); Thomas H. Whitesides, Victoria, CA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 12/816,535

(22) Filed: Jun. 16, 2010

(65) Prior Publication Data

US 2011/0012825 A1    Jan. 20, 2011

Related U.S. Application Data

(60) Continuation-in-part of application No. 12/188,648, filed on Aug. 8, 2008, which is a continuation-in-part of application No. 11/673,269, filed on Feb. 9, 2007, now Pat. No. 7,411,720, which is a division of application No. 10/711,278, filed on Sep. 7, 2004, now abandoned, which is a division of application No. 10/063,803, filed on May 15, 2002, now Pat. No. 6,822,782.

(60) Provisional application No. 61/187,370, filed on Jun. 16, 2009, provisional application No. 60/291,081, filed on May 15, 2001.

(51) Int. Cl.
*G02B 26/00* (2006.01)

(52) U.S. Cl.
USPC .......................................... 359/296

(58) Field of Classification Search
USPC .......................................... 359/296
See application file for complete search history.

(56) References Cited

U.S. PATENT DOCUMENTS

| | | |
|---|---|---|
| 4,285,801 A | 8/1981 | Chiang |
| 4,298,448 A | 11/1981 | Muller et al. |
| 4,680,103 A | 7/1987 | Beilin et al. |
| 4,891,245 A | 1/1990 | Micale |
| 5,360,689 A | 11/1994 | Hou et al. |
| 5,783,614 A | 7/1998 | Chen et al. |
| 5,914,806 A | 6/1999 | Gordon, II et al. |
| 5,961,804 A | 10/1999 | Jacobson et al. |
| 6,017,584 A | 1/2000 | Albert et al. |
| 6,067,185 A | 5/2000 | Albert et al. |
| 6,117,368 A | 9/2000 | Hou |
| 6,120,588 A | 9/2000 | Jacobson |
| 6,120,839 A | 9/2000 | Comiskey et al. |
| 6,262,706 B1 | 7/2001 | Albert et al. |

(Continued)

OTHER PUBLICATIONS

Kitamura, T., et al., "Electrical toner movement for electronic paper-like display", Asia Display/IDW '01, p. 1517, Paper HCS1-1 (2001).

(Continued)

*Primary Examiner* — James Jones
(74) *Attorney, Agent, or Firm* — David J. Cole

(57) ABSTRACT

In electrophoretic media, it is advantageous to use pigment particles having a polymer chemically bonded to, or cross-linked around, the pigment particles, the polymer comprising repeating units derived from a fluorinated acrylate or fluorinated methacrylate monomer. The polymer desirably has a branched chain structure with side chains extending from a main chain. Desirably, the fluorinated acrylate or fluorinated methacrylate monomer comprises from 1 to 5 mole percent of the polymer.

22 Claims, 7 Drawing Sheets

(56) References Cited

U.S. PATENT DOCUMENTS

| | | |
|---|---|---|
| 6,262,833 B1 | 7/2001 | Loxley et al. |
| 6,300,932 B1 | 10/2001 | Albert |
| 6,323,989 B1 | 11/2001 | Jacobson et al. |
| 6,377,387 B1 | 4/2002 | Duthaler et al. |
| 6,515,649 B1 | 2/2003 | Albert et al. |
| 6,538,801 B2 | 3/2003 | Jacobson et al. |
| 6,580,545 B2 | 6/2003 | Morrison et al. |
| 6,652,075 B2 | 11/2003 | Jacobson |
| 6,672,921 B1 | 1/2004 | Liang et al. |
| 6,693,620 B1 | 2/2004 | Herb et al. |
| 6,721,083 B2 | 4/2004 | Jacobson et al. |
| 6,727,881 B1 | 4/2004 | Albert et al. |
| 6,788,449 B2 | 9/2004 | Liang et al. |
| 6,822,782 B2 | 11/2004 | Honeyman et al. |
| 6,839,158 B2 | 1/2005 | Albert et al. |
| 6,866,760 B2 | 3/2005 | Paolini, Jr. et al. |
| 6,870,661 B2 | 3/2005 | Pullen et al. |
| 6,922,276 B2 | 7/2005 | Zhang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,038,655 B2 | 5/2006 | Herb et al. |
| 7,075,502 B1 | 7/2006 | Drzaic et al. |
| 7,116,318 B2 | 10/2006 | Amundson et al. |
| 7,170,670 B2 | 1/2007 | Webber |
| 7,180,649 B2 | 2/2007 | Morrison et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,247,379 B2 | 7/2007 | Pullen et al. |
| 7,312,784 B2 | 12/2007 | Baucom et al. |
| 7,312,916 B2 | 12/2007 | Pullen et al. |
| 7,321,459 B2 | 1/2008 | Masuda et al. |
| 7,352,502 B2 | 4/2008 | Miyazaki et al. |
| 7,375,875 B2 | 5/2008 | Whitesides et al. |
| 7,411,719 B2 | 8/2008 | Paolini, Jr. et al. |
| 7,411,720 B2 | 8/2008 | Honeyman et al. |
| 7,453,445 B2 | 11/2008 | Amundson |
| 7,532,388 B2 | 5/2009 | Whitesides et al. |
| 7,535,624 B2 | 5/2009 | Amundson et al. |
| 7,679,814 B2 | 3/2010 | Paolini et al. |
| 7,746,544 B2 | 6/2010 | Comiskey et al. |
| 7,839,564 B2 | 11/2010 | Whitesides et al. |
| 7,903,319 B2 | 3/2011 | Honeyman et al. |
| 7,955,532 B2 | 6/2011 | Liang et al. |
| 8,009,348 B2 | 8/2011 | Zehner et al. |
| 8,018,640 B2 | 9/2011 | Whitesides et al. |
| 8,115,729 B2 | 2/2012 | Danner et al. |
| 8,305,341 B2 | 11/2012 | Arango et al. |
| 8,390,918 B2 | 3/2013 | Wilcox et al. |
| 2001/0046081 A1* | 11/2001 | Hayashi et al. ............... 359/296 |
| 2005/0012980 A1 | 1/2005 | Wilcox et al. |
| 2005/0018273 A1 | 1/2005 | Honeyman et al. |
| 2009/0009852 A1 | 1/2009 | Honeyman et al. |
| 2009/0206499 A1 | 8/2009 | Whitesides et al. |
| 2009/0225398 A1 | 9/2009 | Duthaler et al. |

OTHER PUBLICATIONS

Yamaguchi, Y., et al., "Toner display using insulative particles charged triboelectrically", Asia Display/IDW '01, p. 1729, Paper AMD4-4 (2001).

\* cited by examiner

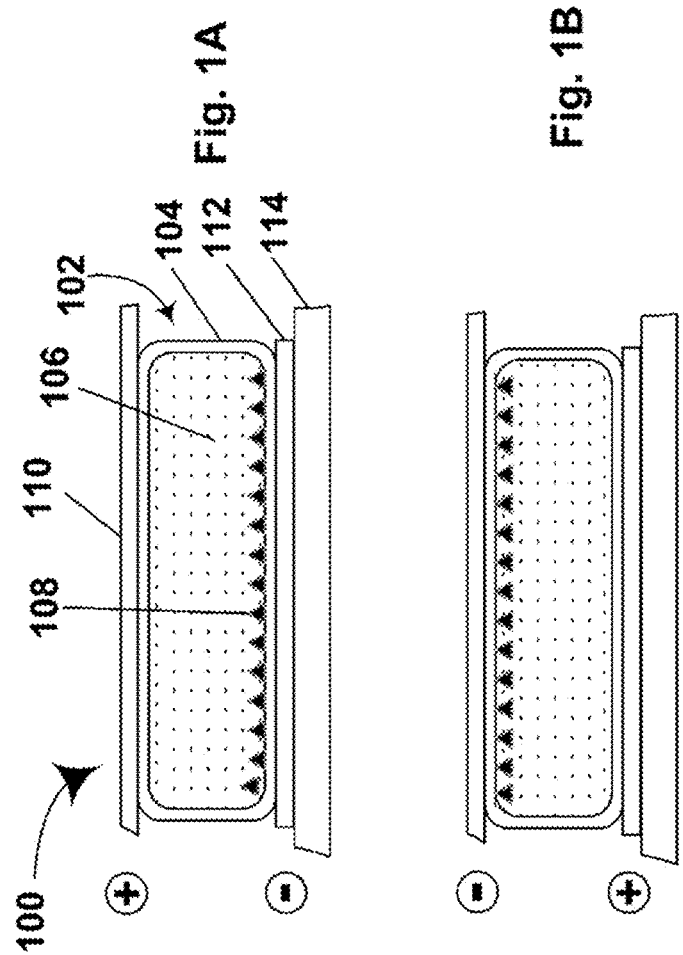

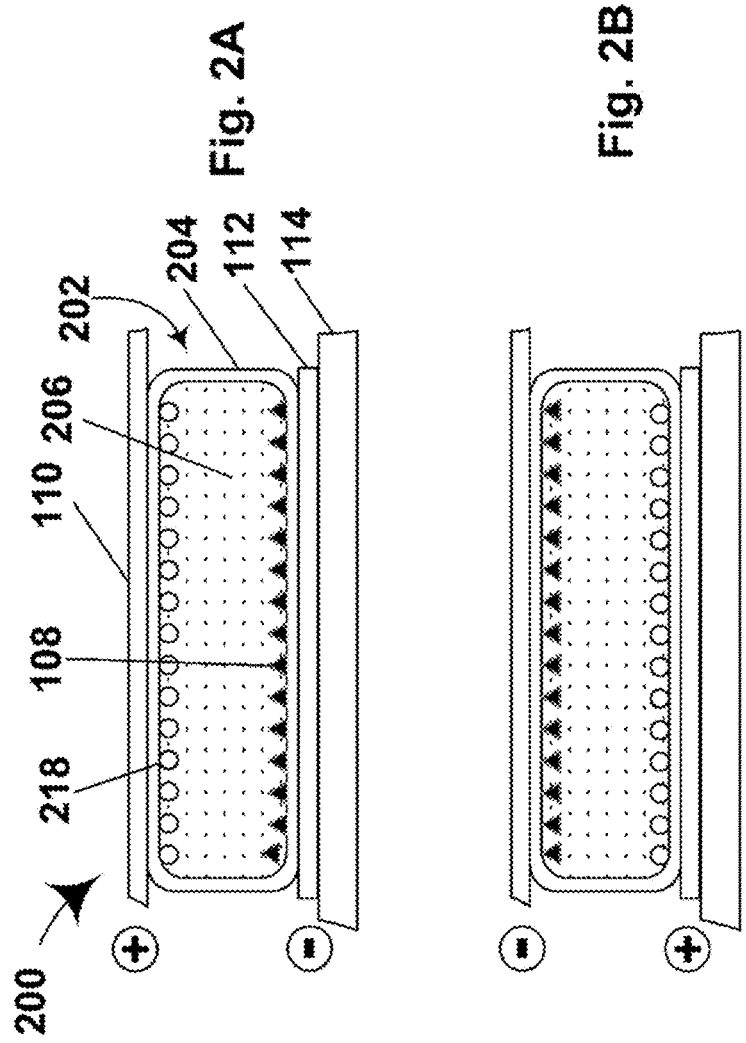

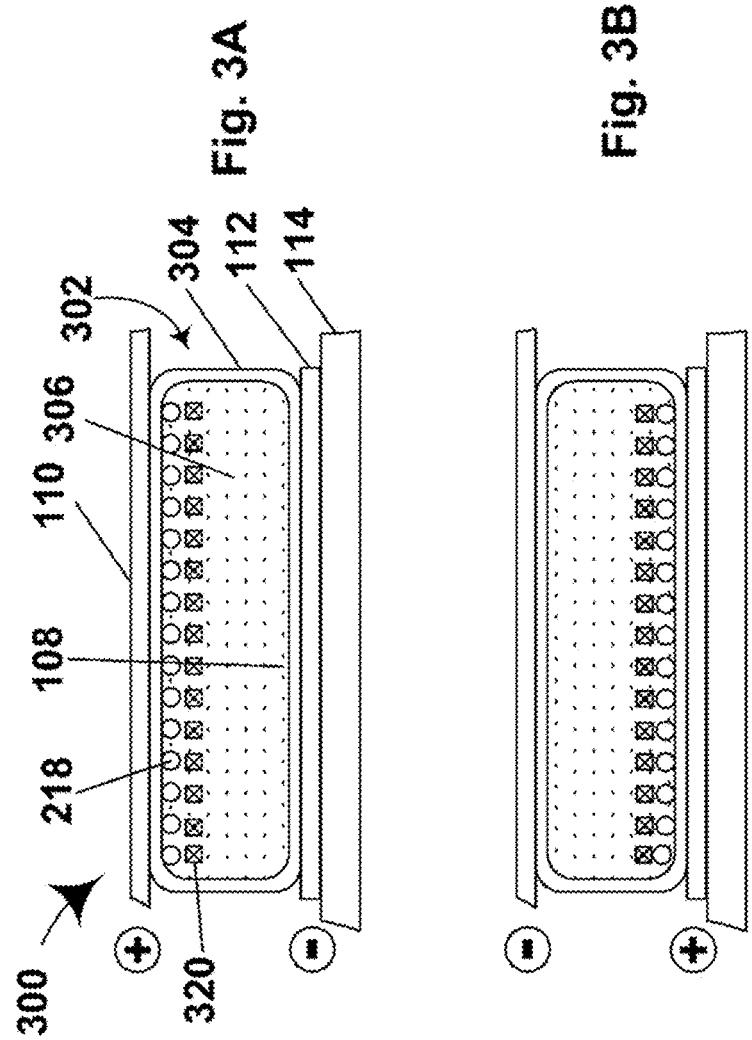

ELECTROPHORETIC PARTICLES AND PROCESSES FOR THE PRODUCTION THEREOF

REFERENCE TO RELATED APPLICATIONS

This application claims benefit of provisional application Ser. No. 61/187,370, filed Jun. 16, 2009. This application is also a continuation-in-part of application Ser. No. 12/188,648, filed Aug. 8, 2008 (Publication No. 2009/0009852), which is a continuation-in-part of application Ser. No. 11/673,269, filed Feb. 9, 2007 (now U.S. Pat. No. 7,411,720, issued Aug. 12, 2008), which is a divisional of application Ser. No. 10/711,278, filed Sep. 7, 2004 (Publication No. 2005/0018273, now abandoned), which is itself a divisional of application Ser. No. 10/063,803, filed May 15, 2002 (now U.S. Pat. No. 6,822,782, issued Nov. 23, 2004), which itself claims priority from Provisional Application Ser. No. 60/291,081 filed May 15, 2001. The entire disclosures of all these earlier applications, which may hereinafter for convenience be referred to as the "polymer-coated electrophoretic particle" or "PCEP" applications, are herein incorporated by reference.

BACKGROUND OF INVENTION

This invention relates to electrophoretic particles (i.e., particles for use in an electrophoretic medium) and processes for the production of such electrophoretic particles. This invention also relates to electrophoretic media and displays incorporating such particles. More specifically, this invention relates to electrophoretic particles the surfaces of which are modified with polymers.

Electrophoretic displays have been the subject of intense research and development for a number of years. Such displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.) Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology and E Ink Corporation have recently been published describing various technologies used in encapsulated electrophoretic and media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; 7,532,388; and 7,679,814; and U.S. Patent Applications Publication Nos. 2005/0012980; 2006/0202949; 2008/0013155; 2008/0013156; 2008/0266245 2008/0266246; 2009/0009852; 2009/0027762; 2009/0206499; 2009/0225398; and 2010/0045592;

(b) Capsules, binders and encapsulation processes; see for example U.S. Patents Nos. 6,922,276; and 7,411,719;

(c) Films and sub-assemblies containing electro-optic materials; see for example U.S. Pat. No. 6,982,178; and U.S. Patent Application Publication No. 2007/0109219;

(d) Backplanes, adhesive layers and other auxiliary layers and methods used in displays; see for example U.S. Pat. Nos. 7,116,318; and 7,535,624;

(e) Color formation and color adjustment; see for example U.S. Patent No. 7,075,502; U.S. Patent Application Publication No. 2007/0109219;

(f) Methods for driving displays; see for example U.S. Pat. Nos. 7,012,600; and 7,453,445; and (g) Applications of displays; see for example U.S. Pat. No 7,312,784; and U.S. Patent Application Publication No. 2006/0279527.

Known electrophoretic media, both encapsulated and unencapsulated, can be divided into two main types, referred to hereinafter for convenience as "single particle" and "dual particle" respectively. A single particle medium has only a single type of electrophoretic particle suspending in a colored suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) The optical characteristic is typically color visible to the human eye, but may, alternatively or in addition, be any one of more of reflectivity, retroreflectivity, luminescence, fluorescence, phosphorescence, or color in the broader sense of meaning a difference in absorption or reflectance at non-visible wavelengths. When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode, so that the particles are hidden by the colored suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If, as discussed in more detail below with reference to FIGS. 2A and 2B, the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If, as discussed below with reference to FIGS. 3A and 3B, the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Some of the aforementioned patents and published applications disclose encapsulated electrophoretic media having three or more different types of particles within each capsule. For purposes of the present application, such multi-particle media are regarded as sub-species of dual particle media.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed using a variety of methods, the display itself can be made inexpensively. However, the service life of encapsulated electrophoretic displays, of both the single and dual particle types, is still lower than is altogether desirable. It appears (although this invention is in no way limited by any theory as to such matters) that this service life is limited by factors such as sticking of the electrophoretic particles to the capsule wall, and the tendency of particles to aggregate into clusters which prevent the particles completing the movements necessary for switching of the display between its optical states. In this regard, opposite charge dual particle electrophoretic displays pose a particularly difficult problem, since inherently oppositely charged particles in close proximity to one another will be electrostatically attracted to each other and will display a strong tendency to form stable aggregates. Experimentally, it has been found that if one attempts to produce a black/white encapsulated display of this type using untreated commercially available titania and carbon black pigments, the display either does not switch at all or has a service life so short as to be undesirable for commercial purposes.

It has long been known that the physical properties and surface characteristics of electrophoretic particles can be modified by adsorbing various materials on to the surfaces of the particles, or chemically bonding various materials to these surfaces. For example, U.S. Pat. No. 4,285,801 (Chiang) describes an electrophoretic display composition in which the particles are coated with a highly fluorinated polymer, which acts as a dispersant, and which is stated to prevent the particles from flocculating and to increase their electrophoretic sensitivity. U.S. Pat. No. 4,298,448 (Müller et al.) describes an electrophoretic medium in which the particles are coated with an organic material, such as a wax, which is solid at the operating temperature of the medium but which melts at a higher temperature. The coating serves to lower the density of the electrophoretic particles and is also stated to increase the uniformity of the charges thereon. U.S. Pat. No. 4,891,245 describes a process for producing particles for use in electrophoretic displays, wherein a heavy, solid pigment, preferred for its high contrast or refractive index properties, is coated with a polymeric material. This process significantly reduces the specific density of the resultant particle, and is stated to create particles with smooth polymer surfaces that can be chosen for stability in a given electrophoretic carrier fluid, and possess acceptable electrophoretic characteristics. U.S. Pat. No. 4,680,103 (Beilin Solomon I et al.) describes a single particle electrophoretic display using inorganic pigment particles coated with an organosilane derivative containing quaternary ammonium groups; this coating is stated to provide quick release of the particles from the electrode adjacent the observer and resistance to agglomeration.

Later, it was found that simple coating of the electrophoretic particles with the modifying material was not entirely satisfactory since a change in operating conditions might cause part or all of the modifying material to leave the surface of the particles, thereby causing undesirable changes in the electrophoretic properties of the particles; the modifying material might possibly deposit on other surfaces within the electrophoretic display, which could give rise to further problems. Accordingly, techniques have been developed for securing the modifying material to the surface of the particles.

For example, U.S. Pat. No. 5,783,614 (Chen et al.) describes an electrophoretic display using diarylide yellow pigment particles modified with a polymer of pentafluorostyrene. The modified particles are produced by forming a mixture of the unmodified particles, the pentafluorostyrene monomer and a free radical initiator, and heating and agitating this mixture so that the monomer polymerizes in situ on the surface of the particles.

U.S. Pat. No. 5,914,806 (Gordon II et al.) describes electrophoretic particle formed by reacting pigment particles with a pre-formed polymer so that the polymer becomes covalently bonded to the surface of the particles. This process is of course restricted to pigments and polymers having chemical properties which allow the necessary reaction to form the covalent bond. Furthermore, a polymer with only a few sites capable of reacting with the particle material has difficulty in reacting with the solid interface at the particle surface; this can be due to polymer chain conformation in solution, steric congestion at the particle surface, or slow reactions between the polymer and the surface. Often, these problems restrict such reactions to short polymer chains, and such short chains typically only have a small effect on particle stability in electrophoretic media.

It is also known to use, in electrophoretic displays, particles consisting essentially of polymer; if dark colored particles are required, the polymer particles can be stained with a heavy metal oxide. See, for example, U.S. Pat. Nos. 5,360,689; 5,498,674; and 6,117,368. Although forming the electrophoretic particles from a polymer allows close control over the chemical composition of the particles, such polymer particles usually have much lower opacity than particles formed from inorganic pigments.

Despite the considerable amount of work which appears to have been done regarding attachment of modifying materials to electrophoretic particles, the prior art contains little discussion of the effects of varying amounts of modifying material upon the behavior of the particles, it apparently being assumed that the ideal is to achieve complete coverage of the electrophoretic particle with the modifying material. It has now been found that, at least with many polymeric modifying materials, this is not in fact the case, and that there is an optimum amount of polymer which should be deposited; too large a proportion of polymer in the modified particle causes an undesirable reduction in the electrophoretic mobility of the particle.

It has also been found that the structure of the polymer used to form the coating on the particle is important, and this invention relates to specific preferred forms of polymer for this purpose. More specifically, it has been found that, in a dual particle electrophoretic system, the particle charge, typically measured as the zeta potential, plays an important role in overall switching properties. Prior art technology, as described in the PCEP applications, provides negative charge to the pigment particles through the incorporation of silanes on the pigment surface. These silanes provide charge as surface hydroxyl groups. Although a negatively charged white pigment and a satisfactory electrophoretic medium can be obtained in this manner, it is difficult to make the pigment more negative by use of more silane; it appears that at some level p It has now been found that the charge on the pigment particles can be adjusted by incorporating fluorinated acrylates or fluorinated methacrylates (especially 2,2,2-trifluoroethyl methacrylate, hereinafter abbreviated as "TFEM") into the polymer shell, thus providing a way to make the pigment more negative independent of the amount of silane used.

SUMMARY OF THE INVENTION

In one aspect, this invention provides an electrophoretic medium comprising a plurality of pigment particles in a fluid, the pigment particles having a polymer chemically bonded to, or cross-linked around, the pigment particles, wherein the polymer comprises repeating units derived from a fluorinated acrylate or fluorinated methacrylate monomer.

The electrophoretic medium of the present invention may incorporate any of the optional features of the PCEP applications mentioned above. In general, in the electrophoretic media of the present invention, it is preferred that the polymer be chemically bonded, especially covalently bonded, to the particle, rather than cross-linked around the particle. The preferred proportion of polymer in the coated particles will typically be substantially as described in the aforementioned U.S. Pat. No. 6,822,782, namely that the particles have from about 4 to about 15, desirably from about 8 to about 12, percent of the weight of the particles of the polymer bonded to the particles. The particles may comprise a metal oxide or hydroxide, for example titania. The polymer may comprise charged or chargeable groups, for example amino or carboxylic acid groups. The polymer may comprise a main chain and a plurality of side chains extending from the main chain, each of the side chains comprising at least about four carbon atoms. Typically, the polymer will be formed from two or more acrylate and/or methacrylate monomers.

Typically, the fluorinated monomer will be used in combination with a non-fluorinated acrylate or methacrylate monomer (i.e., the polymer may comprises residues derived from both fluorinated and non-fluorinated acrylate and/or methacrylate monomers), lauryl methacrylate being a preferred monomer for this purpose. The molar ratio of fluorinated monomer to non-fluorinated monomer may vary but the fluorinated monomer will typically comprises from about 0.1 to about 5 percent, and desirably about 1 to about 5 mole percent of the total monomer in the polymer. Highly fluorinated monomers containing at least three fluorine atoms are preferred. A specific preferred fluorinated monomer is 2,2,2-trifluoroethyl methacrylate, but other fluorinated monomers may also be used, for example 2,2,3,4,4,4-hexafluorobutyl acrylate and 3,3,4,4,5,5,6,6,7,7,8,8,8-tridecafluorooctyl acrylate.

This invention extends to an electrophoretic display comprising an electrophoretic medium of the present invention and at least one electrode arranged to apply an electric field to the electrophoretic medium, and to an electronic book reader, portable computer, tablet computer, cellular telephone, smart card, sign, watch, shelf label or flash drive comprising such a display.

BRIEF DESCRIPTION OF THE DRAWINGS

Preferred embodiments of the invention will now be described, though by way of illustration only, with reference to the accompanying drawings, in which:

FIGS. 1A and 1B are schematic cross-sections through a first electrophoretic display of the present invention in which the electrophoretic medium comprises a single type of particle in a colored suspending fluid.

FIGS. 2A and 2B are schematic cross-sections, generally similar to those of FIGS. 1A and 1B respectively through a second electrophoretic display of the present invention in which the electrophoretic medium comprises two different types of particle, bearing charges of opposite polarity, in an uncolored suspending fluid.

FIGS. 3A and 3B are schematic cross-sections, generally similar to those of FIGS. 2A and 2B respectively through a third electrophoretic display of the present invention in which the electrophoretic medium comprises two different types of particle, bearing charges of the same polarity but differing in electrophoretic mobility, in an uncolored suspending fluid.

DETAILED DESCRIPTION

Figure 4A:
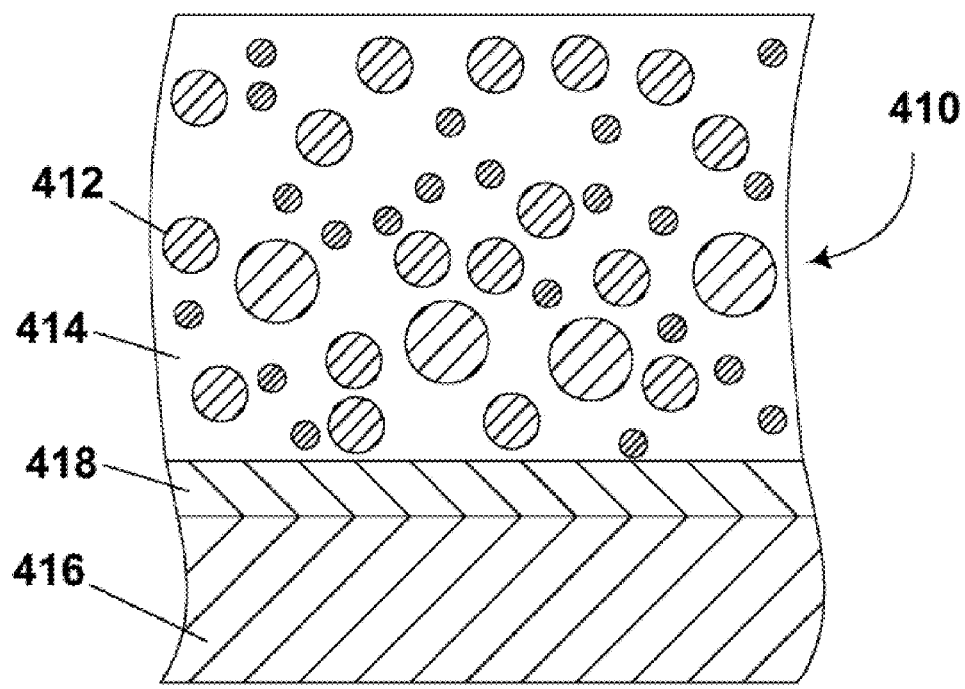
FIGS. 4A and 4B illustrate a polymer-dispersed electrophoretic medium of the present invention and the process used to produce this medium.

Before discussing the electrophoretic media and processes of the present invention in detail, it is believed desirable to briefly describe some of the types of electrophoretic displays in which these media are intended to be used.

The electrophoretic medium of the present invention may be of any of the types described in the aforementioned E Ink and MIT patents and applications, and preferred embodiments of such media will now be described with reference to FIGS. 1 to 4 of the accompanying drawings.

The first electrophoretic display (generally designed 100) of the invention shown in FIGS. 1A and 1B comprises an encapsulated electrophoretic medium (generally designated 102) comprising a plurality of capsules 104 (only one of which is shown in FIGS. 1A and 1B), each of which contains a suspending liquid 106 and dispersed therein a plurality of a single type of particle 108, which for purposes of illustration will be assumed to be black. The particles 108 are electrophoretically mobile and may be formed of carbon black. In the following description, it will be assumed that the particles 108 are positively charged, although of course negatively charged particles could also be used if desired. (The triangular shape of the particles 108, and the square and circular shapes of other particles discussed below, are used purely to way of illustration to enable the various types of particles to be distinguished easily in the accompanying drawings, and in no way correspond to the physical forms of the actual particles, which are typically substantially spherical. However, we do not exclude the use of non-spherical particles in the present displays.) The display 100 further comprises a common, transparent front electrode 110, which forms a viewing surface through which an observer views the display 100, and a plurality of discrete rear electrodes 112, each of which defines one pixel of the display 100 (only one rear electrode 112 is shown in FIGS. 1A and 1B). For ease of illustration and comprehension, FIGS. 1A and 1B show only a single microcapsule forming the pixel defined by rear electrode 112, although in practice a large number (20 or more) microcapsules are normally used for each pixel. The rear electrodes 112 are mounted upon a substrate 114.

The suspending liquid 106 is colored such that the particles 108 lying in the positions shown in FIG. 1A adjacent the rear electrodes 112 are not visible to an observer viewing the display 100 via the front electrode 110. The necessary color in the suspending liquid 106 may be provided by dissolving a dye in the liquid. Since the colored suspending liquid 106 and the particles 108 render the electrophoretic medium 102 opaque, the rear electrodes 112 and the substrate 114 can be transparent or opaque since they are not visible through the opaque electrophoretic medium 102.

The capsules 104 and the particles 108 can be made in a wide range of sizes. However, in general it is preferred that the thickness of the capsules, measured perpendicular to the electrodes, be in the range of about 15 to 500 μm, while the particles 108 will typically have diameters in the range of about 0.25 to about 2 μm.

FIG. 1A shows the display 100 with the rear electrode 112 negatively charged and the front electrode 110 positively charged. Under this condition, the positively-charged particles 108 are attracted to the negative rear electrode 112 and thus lie adjacent the rear electrode 112, where they are hidden from an observer viewing the display 100 through the front electrode 110 by the colored liquid 106. Accordingly, the pixel shown in FIG. 1A displays to the observer the color of the liquid 106, which for purposes of illustration will be assumed to be white. (Although the display 100 is illustrated in FIGS. 1A and 1B with the rear electrodes 112 at the bottom, in practice both the front and rear electrodes are typically disposed vertically for maximum visibility of the display 100. In general, the media and displays of the invention described herein do not rely in any way upon gravity to control the movement of the particles; such movement under gravity is in practice far too slow to be useful for controlling particle movement.)

FIG. 1B shows the display 100 with the front electrode 110 made negative relative to the rear electrode 112. Since the particles 108 are positively charged, they will be attracted to the negatively-charged front electrode 110, and thus the particles 108 move adjacent the front electrode 110, and the pixel displays the black color of the particles 108.

In FIGS. 1A and 1B, the capsules 104 are illustrated as being of substantially prismatic form, having a width (parallel to the planes of the electrodes) significantly greater than their height (perpendicular to these planes). This prismatic shape of the capsules 104 is deliberate. If the capsules 104 were essentially spherical, in the black state shown in FIG. 1B, the particles 108 would tend to gather in the highest part of the capsule, in a limited area centered directly above the center of the capsule. The color seen by the observer would then be essentially the average of this central black area and a white annulus surrounding this central area, where the white liquid 106 would be visible. Thus, even in this supposedly black state, the observer would see a grayish color rather than a pure black, and the contrast between the two extreme optical states of the pixel would be correspondingly limited. In contrast, with the prismatic form of microcapsule shown in FIGS. 1A and 1B, the particles 108 cover essentially the entire cross-section of the capsule so that no, or at least very little white liquid is visible, and the contrast between the extreme optical states of the capsule is enhanced. For further discussion on this point, and on the desirability of achieving close-packing of the capsules within the electrophoretic layer, the reader is referred to the aforementioned U.S. Pat. No. 6,067,185, and the corresponding published International Application WO 99/10767. Also, as described in the aforementioned E Ink and MIT patents and applications, to provide mechanical integrity to the electrophoretic medium, the microcapsules are normally embedded within a solid binder, but this binder is omitted from FIGS. 1 to 3 for ease of illustration.

The second electrophoretic display (generally designed 200) of the invention shown in FIGS. 2A and 2B comprises an encapsulated electrophoretic medium (generally designated 202) comprising a plurality of capsules 204, each of which contains a suspending liquid 206 and dispersed therein a plurality of positively charged black particles 108 identical discussed to those in the first display 100 discussed above. The display 200 further comprises a front electrode 110, rear electrodes 112, and a substrate 114, all of which are identical to the corresponding integers in the first display 100. However, in addition to the black particles 108, there are suspended in the liquid 206 a plurality of negatively charged, particles 218, which for present purposes will be assumed to be white.

Typically the liquid 206 is uncolored (i.e., essentially transparent), although some color may be present therein to adjust the optical properties of the various states of the display. FIG. 2A shows the display 200 with the front electrode 110 positively charged relative to the rear electrode 112 of the illustrated pixel. The positively charged particles 108 are held electrostatically adjacent the rear electrode 112, while the negatively charged particles 218 are held electrostatically against the front electrode 110. Accordingly, an observer viewing the display 200 through the front electrode 110 sees a white pixel, since the white particles 218 are visible and hide the black particles 108.

FIG. 2B shows the display 200 with the front electrode 110 negatively charged relative to the rear electrode 112 of the illustrated pixel. As in the corresponding optical state shown in FIG. 1B, the positively charged particles 108 are now electrostatically attracted to the negative front electrode 110, while the negatively charged particles 218 are electrostatically attracted to the positive rear electrode 112. Accordingly, the particles 108 move adjacent the front electrode 110, and the pixel displays the black color of the particles 108, which hide the white particles 218.

The third electrophoretic display (generally designated 300) of the invention shown in FIGS. 3A and 3B comprises an encapsulated electrophoretic medium (generally designated 302) comprising a plurality of capsules 304. The display 300 further comprises a front electrode 110, rear electrodes 112, and a substrate 114, all of which are identical to the corresponding integers in the displays 100 and 200 previously described. The display 300 resembles the display 200 described above in that the liquid 306 is uncolored and that white negatively charged particles 218 are suspended therein. However, that the display 300 differs from the display 200 by the presence of red negatively charged particles 320, which have a substantially lower electrophoretic mobility than the white particles 218.

FIG. 3A shows the display 300 with the front electrode 110 positively charged relative to the rear electrode 112 of the illustrated pixel. Both the negatively charged white particles 218 and the negatively charged red particles 320 are attracted to the front electrode 110, but since the white particles 218 have substantially higher electrophoretic mobility, that they reach the front electrode 110 first (note that the optical state shown in FIG. 3A is normally generated by abruptly reversing the polarity off the electrodes in the optical state shown in FIG. 3B, thus forcing both the white particles 218 and the red particles 320 to traverse the thickness of the capsule 304, and thus allowing the greater mobility of the white particles 218 to cause them to reach their positions adjacent the front electrode 110 before the red particles 320). Thus, the white particles 218 form a continuous layer immediately adjacent the front electrode 110, thereby hiding the red particles 320. Accordingly, an observer viewing the display 300 through the front electrode 110 sees a white pixel, since the white particles 218 are visible and hide the red particles 320.

FIG. 3B shows the display 300 with the front electrode 110 negatively charged relative to the rear electrode 112 of the illustrated pixel. Both the negatively charged white particles 218 and the negatively charged red particles 320 are attracted to the rear electrode 112, but since the white particles have higher electrophoretic mobility, when the optical state shown in FIG. 3B is produced by reversing the polarity on the electrodes in the optical state shown in FIG. 3A, the white particles 218 reach the rear electrode 112 more quickly than do the red particles 320, so that the white particles 218 form a continuous layer adjacent the electrode 112, leaving a continuous layer of the red particles 320 facing the front electrode 110. Accordingly, an observer viewing the display 300 through the front electrode 110 sees a red pixel, since the red particles 320 are visible and hide the white particles 218.

Figure 4B:
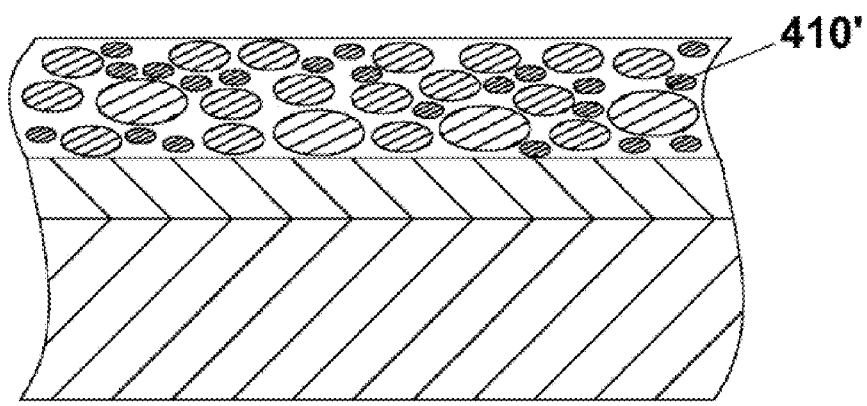

FIGS. 4A and 4B illustrate a polymer-dispersed electrophoretic medium of the present invention and the process used to produce this medium. This polymer-dispersed medium contains non-spherical droplets and is prepared by using a film-forming material which produces a film capable of being shrunk substantially after its formation. The preferred discontinuous phase for this purpose is gelatin, although other proteinaceous materials, and possibly cross-linkable polymers may alternatively be employed. A mixture of the liquid material (which will eventually form the continuous phase) and the droplets is formed and coated on to a substrate to form a structure as illustrated in FIG. 4A. FIG. 4A shows a layer 410 comprising droplets 412 dispersed in a liquid medium 414 which is in the process of forming a film, this layer 410 having been coated on a substrate 416 (preferably a flexible polymeric film, such as a polyester film) previously provided with a layer 418 of a transparent electrically conductive material, such as indium-tin oxide. The liquid material forms a relatively thick layer 410 containing essentially spherical droplets 412; as shown in FIG. 4A. After the layer 410 has formed a solid continuous phase, the layer is then allowed to dry, preferably at about room temperature (although the layer may be heated if desired) for a period sufficient to dehydrate the gelatin, thus causing substantial reduction in the thickness of the layer and producing the type of structure illustrated in FIG. 4B, the dried and shrunken layer being designated 410' in FIG. 4B. The vertical shrinkage of the layer (i.e., the shrinkage perpendicular to the surface of the substrate 416) in effect compresses the original spherical droplets into oblate ellipsoids whose thickness perpendicular to the surface is substantially smaller than their lateral dimensions parallel to the surface. In practice, the droplets are normally sufficiently closely packed that the lateral edges of adjacent droplets contact each other, so that the final forms of the droplets more closely resemble irregular prisms than oblate ellipsoids. Also as shown in FIG. 4B, more than one layer of droplets may be present in the final medium. When the medium is of the type shown in FIG. 4B in which the droplets are polydisperse (i.e., a wide range of droplet sizes are present), the presence of such multiple layers is advantageous in that it reduces the chance that small areas of the substrate will not be covered by any droplet; hence, the multiple layers help to ensure that the electrophoretic medium is completely opaque and that no part of the substrate is visible in a display formed from the medium. However, in a medium using essentially monodisperse droplets (i.e., droplets all of substantially the same size), it will generally be advisable to coat the medium in a layer which, after shrinkage, will produce a close-packed monolayer of droplets, cf. U.S. Pat. No. 6,839,158. Because they lack the relatively rigid microcapsule walls found in microencapsulated electrophoretic media, the droplets in polymer-dispersed media of the present invention may tend to pack more tightly into a close-packed monolayer than do microcapsules.

Contrary to what might be expected, experimentally it has been found that the droplets do not coalesce during the drying of the medium. However, we do not exclude the possibility that, in certain embodiments of the invention some rupturing of the walls between adjacent capsules might occur, thus providing a partial connection between droplets.

The degree of deformation of the droplets which occurs during the drying step, and hence the final forms of the droplets, may be varied by controlling the proportion of water in the gelatin solution and the ratio of this solution to the droplets. For example, experiments were conducted using gelatin solutions of from 2 to 15 percent by weight, and using 200 grams of each gelatin solution and 50 grams of the internal non-aqueous phase which forms the droplets. To produce a final layer of electrophoretic medium 30 μm in thickness, it was necessary to coat a layer of the 2 percent gelatin solution/internal phase mixture 139 gm in thickness; upon drying, this layer produced an electrophoretic medium 30 μm in thickness containing 92.6 percent by volume of droplets. On the other hand, to produce the same final thickness of electrophoretic medium, the 15 percent gelatin solution/internal phase mixture was coated at a thickness of 93 μm, and upon drying produced an electrophoretic medium containing 62.5 percent by volume of droplets. The medium produced from the 2 percent gelatin solution was weaker than is desirable to withstand robust handling; media produced from gelatin solutions containing from 5 to 15 percent by weight of gelatin had satisfactory mechanical properties.

The degree of deformation of the droplets in the final electrophoretic medium is also affected by the initial size of the droplets, and the relationship between this initial size and the thickness of the final layer of electrophoretic medium. Experiments indicate that the larger the average initial size of the droplets and/or the larger the ratio of this average initial size to the thickness of the final layer, the greater is the deformation of the droplets from a spherical shape in the final layer. In general, it is preferred that the average initial size of the droplets be from about 25 percent to about 400 percent of the thickness of the final layer. For example, in the experiments previously described, in which the thickness of the final layer was 30 μm, good results were obtained with an initial average droplet size of 10 to 100 μm.

Gelatin forms a film by a sol/gel transformation, but the present invention is not restricted to film-forming materials which form their films by such sol/gel transformation. For example, the formation of the film may be accomplished by the polymerization of a monomer or oligomer, by the cross-linking of a polymer or oligomer, by radiation-curing of a polymer or by any other known film-forming process. Similarly, in the preferred variant of the invention in which the film is first formed and then caused to shrink in thickness, this shrinkage need not accomplished by the same type of dehydration mechanism by which a gelatin film shrinks, but may be accomplished by removal of a solvent, aqueous or non-aqueous, from the film, cross-linking of a polymeric film or any other conventional procedure.

In a polymer-dispersed electrophoretic medium of the present invention, the droplets desirably comprise at least about 40 percent, and preferably about 50 to about 80 percent, by volume of the electrophoretic medium; see U.S. Pat. No. 6,866,760. It should be stressed that the droplets used in the polymer-dispersed media of the present invention may have any of the combinations of particles and suspending fluids illustrated in FIGS. 1 to 3.

The present invention may be applied to any of the forms of encapsulated electrophoretic media shown in FIGS. 1 to 4. However, the present invention is not restricted to encapsulated and polymer-dispersed electrophoretic media, and may also be applied to microcell and unencapsulated media.

As will appear from the Examples below, use of fluorinated monomers in the polymer shells of particles used in electrophoretic displays increases the zeta potential of negatively charged particles, and where, as is commonly the case, the negative particles are white particles such as titania, the resultant increased negative zeta potential manifests itself as an improved (more reflective) white state. The zeta potential becomes increasingly negative as the proportion of fluorinated monomer in the polymer shell increases. However, above about 5 mole percent fluorinated monomer, certain disadvantages become evident. The dark state image loss (measured as the change in the dark state of the display after a period of (say) two minutes without the display being driven, begins to increase, and the dark state itself becomes less dark, thereby adversely affecting the dynamic range of the display (the difference between the dark and white states of the display as measured in L* units, (where L* has the usual CIE definition:

$$L^* = 116(R/R_0)^{1/3} - 16,$$

where R is the reflectance and $R_0$ is a standard reflectance value)). Accordingly, it is generally preferred to keep the molar proportion of the fluorinated monomer in the polymer shell in the range of about 0.1 to about 5, desirably about 1 to about 5, mole percent. It will be appreciated that the optimum proportion of fluorinated monomer may vary somewhat with the specific fluorinated monomer used (and especially its degree of fluorination), the other monomers employed and other factors, including the other particles present in the electrophoretic medium. In general the optimum proportion of fluorinated monomer appears to be about 1 mole percent, since this level of fluorinated monomer gives a substantial increase in the magnitude of the zeta potential while avoiding the aforementioned disadvantages associated with higher proportions of fluorinated monomer.

The polymer-coated particles used in the electrophoretic media of the present invention may be produced by any of the processes described in the aforementioned PCEP applications. In one such process, the particles on which a polymer coating is to be formed are reacted with a bifunctional reagent having a functional group capable of reacting with, and bonding to, the particle and with a polymerizable group, for example a pendant vinyl or other ethylenically unsaturated group.

The following Examples are now given, though by way of illustration only, to shows details of particularly preferred reagents, conditions and techniques used in the present invention.

EXAMPLE 1

Preparation of White Titania Pigment Containing 2,2,2-trifluoroethyl Methacrylate and Lauryl Methacrylate in the Polymer Shell DuPont R-794 titania, surface functionalized with 3-(trimethoxysilyl)propyl methacrylate was prepared substantially as described in the aforementioned PCEP applications. In a 1 L plastic bottle, 500 g of this pigment was dispersed in 426 g (500 mL) of toluene by sonication. A 1 L jacketed glass reactor was charged with 1.7158 moles of monomer divided between lauryl methacrylate and TFEM to yield the desired molar concentrations of each monomer. The molar proportions of TFEM were 0.1, 1, 5, 10, 25, and 50 mole % with the remainder being lauryl methacrylate. The pigment dispersion was added to the reactor, and the reactor was purged with nitrogen and heated to 65° C. A free-radical initiator (5.0 g of 2,2'-azobis(2-methylpropionitrile, AIBN), previously dissolved in 110 mL of toluene, was added dropwise over 60 minutes. The vessel was heated under nitrogen overnight with continuous agitation at 65° C., then exposed to the atmosphere. The mixture was then split into four 1 L plastic bottles, and approximately 500 mL of further toluene was added to each bottle. The bottles were stirred vigorously. The pigment was isolated by centrifugation at 3500 rpm for 20 minutes. The supernatant was discarded, and the pigment was washed twice by adding approximately 700 mL of toluene to each bottle, stirring vigorously to disperse pigment, and centrifuging at 3500 rpm for 20 minutes. The pigment was air dried overnight, then dried under vacuum at 65° C. overnight. Thermogravimetric analysis (TGA) was performed, and yielded polymer concentrations between 6.7% and 9.7% by weight. Zeta potential measurements were performed using a Colloidal Dynamics ZetaProbe on samples dispersed in Isopar E with surfactant (Solsperse 17K). Zeta potential numbers are presented in FIG. 5.

Figure 5:
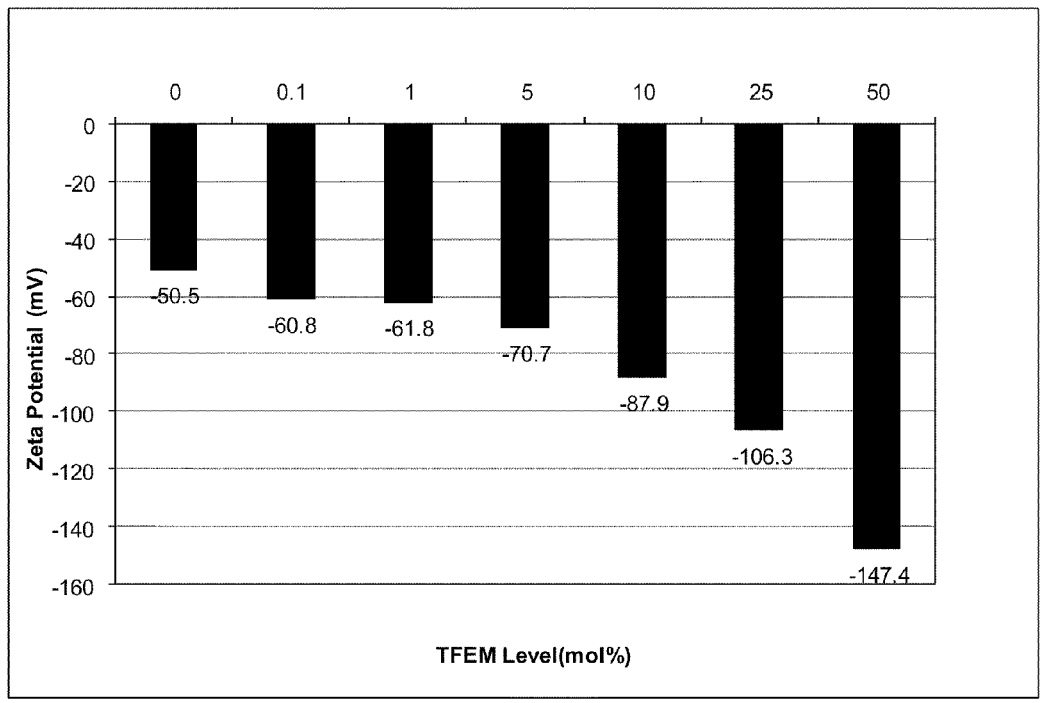
FIG. 5 is a bar graph showing the variation of zeta potential with proportion of fluorinated monomer in the polymer shell in the experiments reported in Example 1 below.

From the data in FIG. 5, it will be seen that the magnitude of the zeta potential increased with increasing TFEM in the polymer shell.

EXAMPLE 2

Preparation of Displays Using Electrophoretic Particles of the Present Invention The polymer-coated titania particles prepared in Example 1 above were converted to electrophoretic displays in the following manner.

Part A: Preparation of capsules

Gelatin-acacia microcapsules were prepared using the pigments prepared in Example 1 and the following procedure. An internal phase was prepared by combining the following in a 250 mL plastic bottle:

| Component | Amount |
|---|---|
| 55% BK-444 based Black Pigment(see copending application Ser. No. 61/150,827, filed Feb. 9, 2009)/Isopar E | 25.88 g |
| 60 wt % White Pigment/Isopar E: | 106.77 g |
| 13 wt % polyisobutylene/Isopar E: | 7.73 g |
| 10 wt % Solsperse 17K/Isopar E: | 23.49 g |
| Isopar E: | 10.12 g |

The resultant mixture was then converted to gelatin-acacia microcapsules substantially as described in the aforementioned U.S. Pat. No. 6,822,782, Examples 27-29.

Part B: Preparation of displays

The microcapsules prepared in Part A above were allowed to stand and excess water decanted. The capsules were then mixed with a polymeric binder at a weight ratio of 8 parts capsules to 1 part binder to produce a slurry. The slurry was bar-coated, using a 4 mil (101 μm) gap, onto an indium tin oxide (ITO)-coated polymeric film at a target coating thickness of 18 μm, and dried in a 60° C. conveyor oven for approximately 2 minutes, and the resultant sheet cut into pieces.

Separately, a release sheet was coated with a 25 μm layer custom polyurethane lamination adhesive as described in U.S. Pat. No. 7,012,735 doped with 180 ppm of tetrabutylammonium hexafluorophosphate, and cut to a size slightly smaller than the microcapsule/polymer film pieces. The two films were laminated to the coating by running them through a hot roll laminator with the top and bottom rollers set at 120° C., and resultant combined film cut to the desired size. The release sheet was removed, and the adhesive layer laminated to 2 inch (51 mm) square polymer film bearing a graphite layer via another pass through the laminator using top and bottom roller temperatures of 93° C. Single pixel displays were cut from the resulting laminate, electrical connections applied, and the experimental single-pixel displays thus produced conditioned at a relative humidity of 50% for 5 days.

EXAMPLE 3

Electro-optic Tests

Electro-optical measurements were take on the single pixel displays prepared in Example 2 using a PR-650 SpectraScan Colorimeter. In these tests, the displays were repeatedly driven to their black and white extreme optical states using 250 millisecond 15 V pulses, then driven to either their black or white extreme optical state. The reflectivity of the optical state was measured about 3 seconds after the final drive pulse (to allow certain transient effects to pass) and then 2 minutes after the final drive pulse, and the two measurements compared to detect any image instability (i.e., lack of bistability in the image).

Figure 6:
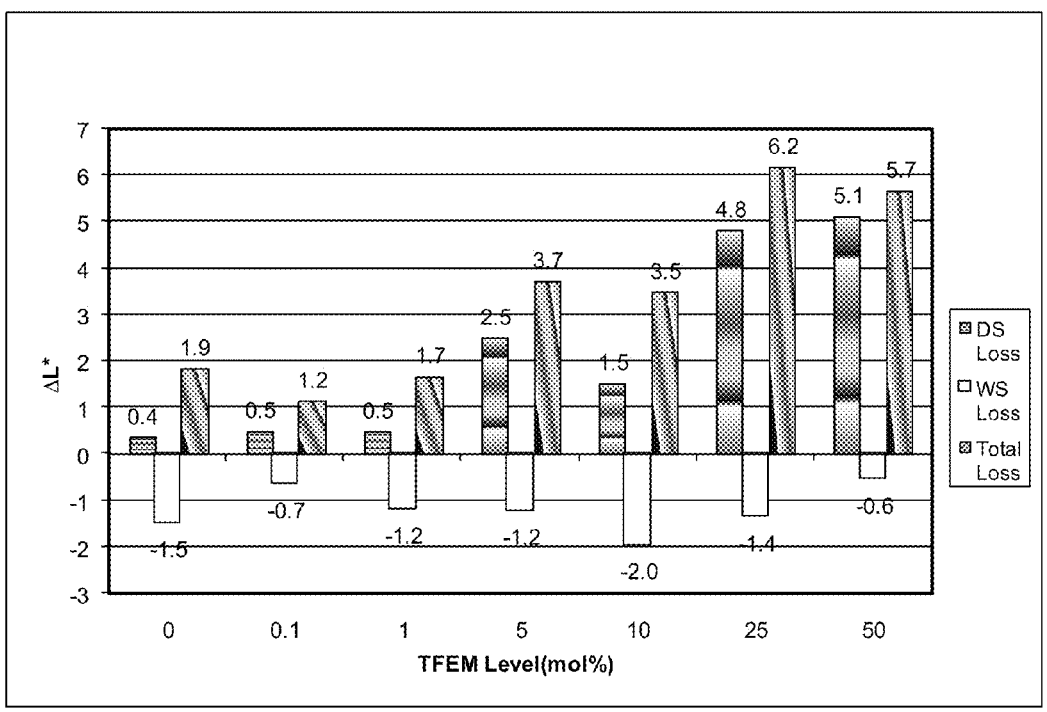
FIG. 6 is a bar graph showing the variation of dark state and white state instabilities with proportion of fluorinated monomer in the polymer shell in the experiments reported in Example 3 below.
Figure 7:
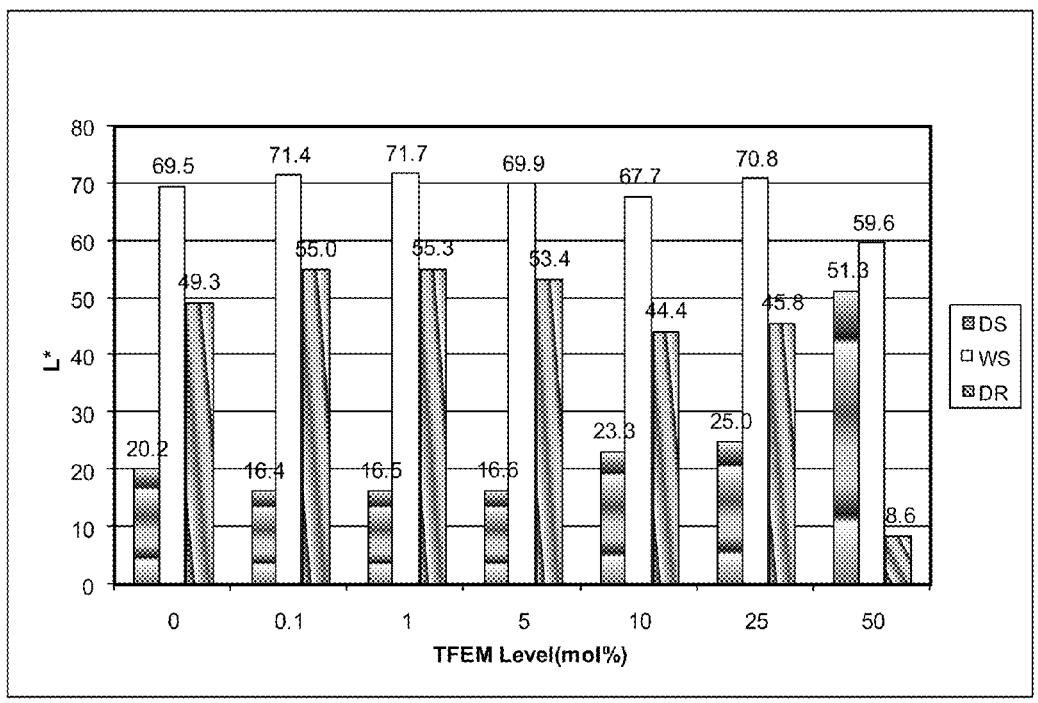
FIG. 7 is a bar graph showing the variation of maximum white state, minimum dark state, and total dynamic range with proportion of fluorinated monomer in the polymer shell in the experiments reported in Example 3 below.

The results are shown in FIG. 6 (in which "DS" refers to dark state and "WS" to white state—the white state image instability values are negative since image instability in the white state results in lower reflectivity), from which it will be seen that there is a noticeable increase in image instability as the level of TFEM in the polymer shell exceeds 1 mole percent. At the 0.1 and 1 mole percent levels of TFEM the image stability is equal to or slightly better than the control. FIG. 7 (in which "DR" refers to dynamic range) shows the maximum white state, minimum dark state, and total dynamic range of each display after the image instability shown in FIG. 6 is taken into account. A trend towards improved optical states, over the control, is seen with increasing levels of TFEM up to, but not including, 10 mole percent. The drop-off in improved optical states at higher TFEM levels can be attributed to a decrease in image stability shown in FIG. 6. From FIGS. 6 and 7, it can be seen that incorporating TFEM in the polymer shell can improve optical states, especially final dynamic range, and that there is a window of TFEM levels which provide improved optical states without loss of image bistability, a major advantage of electrophoretic displays.

It has been shown in other experiments that other fluorinated monomers (namely 2,2,3,4,4,4-hexafluorobutyl acrylate and 3,3,4,4,5,5,6,6,7,7,8,8,8-tridecafluorooctyl acrylate) adjust the zeta potential of the white pigment in similar ways to TFEM and may provide the same improvement in optical states. The exact mechanism by which these fluorinated monomers produce changes in zeta potential and changes in optical states is not at present known.

EXAMPLE 4

This Example illustrates a random graft polymerization process in which the monomers used includes a fluorinated acrylate, namely 2,2,3,4,4,4-hexafluorobutyl acrylate.

To a round-bottomed flask equipped with a condenser, a nitrogen blanket, a stir bar, and stirring beads was added the silanized pigment produced in Example 15 of U.S. Pat. No. 6,822,782 (15 g). A solution of 2-ethylhexyl acrylate (13.5 g) and 2,2,3,4,4,4-hexafluorobutyl acrylate (1.92 g) in toluene (15 g) was added to the flask in a disposable container, and the resultant mixture was stirred for 20 minutes while nitrogen was bubbled therethrough. The needles used to introduce the nitrogen were then removed, and the mixture was slowly heated to 60-65° C., with AIBN (0.15 g) dissolved in toluene (approximately 5 ml) being added when the temperature reached 50° C. The resultant reaction mixture was maintained at 60-65° C. under nitrogen for 18 hours, then allowed to cool to room temperature. Acetone was added, and the reaction mixture was poured into a centrifuge bottle, with additional acetone being added to fill the bottle. The bottle was then centrifuged at 3000 rpm for 15 minutes and the supernatant liquor was decanted. The bottle was filled with THF and shaken vigorously until no pigment remained on the bottom of the bottle, then centrifuged at 3000 rpm for 20 minutes and the supernatant liquor was decanted. The polymer-coated pigment thus produced was allowed to air dry in the bottle until the pigment could readily be broken up, and then dried under vacuum at 50° C. for 18 hours.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electrophoretic medium comprising a plurality of pigment particles suspended in a fluid, the pigment particles having a polymer chemically bonded to, or cross-linked around, the pigment particles, wherein the polymer comprises repeating units derived from a fluorinated acrylate or fluorinated methacrylate monomer.

2. An electrophoretic medium according to claim 1 having two types of particles differing in at least one optical characteristic and having differing electrophoretic mobilities.

3. An electrophoretic display comprising an electrophoretic medium according to claim 1 and at least one electrode arranged to apply an electric field to the electrophoretic medium.

4. An electronic book reader, portable computer, tablet computer, cellular telephone, smart card, sign, watch, shelf label or flash drive comprising a display according to claim 3.

5. An electrophoretic medium comprising a plurality of pigment particles suspended in a fluid, the pigment particles having a polymer chemically bonded to the pigment particles, wherein the polymer comprises repeating units derived from a fluorinated acrylate or fluorinated methacrylate monomer.

6. An electrophoretic medium according to claim 5 wherein from about 0.1 to about 5 mole percent of the monomer in the polymer comprises a fluorinated monomer.

7. An electrophoretic medium according to claim 5 wherein from about 1 to about 5 mole percent of the monomer in the polymer comprises a fluorinated monomer.

8. An electrophoretic medium according to claim 5 wherein the particles have from about 4 to about 15 percent by weight of the pigment of the polymer chemically bonded to the pigment particles.

9. An electrophoretic medium according to claim 8 wherein the particles have from about 8 to about 12 percent by weight of the pigment of the polymer chemically bonded to the pigment particles.

10. An electrophoretic medium according to claim 5 wherein the polymer comprises a main chain and a plurality of side chains extending from the main chain, each of the side chains comprising at least about four carbon atoms.

11. An electrophoretic medium according to claim 5 wherein the polymer further comprises residues derived from a non-fluorinated acrylate and/or methacrylate monomer.

12. An electrophoretic medium according to claim 5 wherein the non-fluorinated methacrylate monomer comprises lauryl methacrylate.

13. An electrophoretic medium according to claim 5 wherein the fluorinated monomer comprises 2,2,2-trifluoroethyl methacrylate.

14. An electrophoretic medium according to claim 5 wherein the fluorinated monomer comprises at least one of 2,2,3,4,4,4-hexafluorobutyl acrylate and 3,3,4,4,5,5,6,6,7,7,8,8,8-tridecafluorooctyl acrylate.

15. An electrophoretic medium according to claim 5 wherein the pigment particles and the fluid are encapsulated in a plurality of capsules or microcells.

16. An electrophoretic medium according to claim 15 wherein the capsules are held within a polymeric binder.

17. An electrophoretic medium according to claim 5 wherein the pigment particles and the fluid are present as a plurality of discrete droplets surrounded by a continuous phase comprising a polymeric material.

18. An electrophoretic medium according to claim 5 wherein the fluid is gaseous.

19. An electrophoretic medium according to claim 5 having two types of particles differing in at least one optical characteristic and having differing electrophoretic mobilities.

20. An electrophoretic medium according to claim 19 wherein the two types of particles bear charges of opposite polarity.

21. An electrophoretic display comprising an electrophoretic medium according to claim 5 and at least one electrode arranged to apply an electric field to the electrophoretic medium.

22. An electronic book reader, portable computer, tablet computer, cellular telephone, smart card, sign, watch, shelf label or flash drive comprising a display according to claim 21.

* * * * *